Patented Jan. 18, 1949

2,459,651

UNITED STATES PATENT OFFICE 2,459,651

SYNTHETIC RESINS DERIVED BY REACTING A CRESOL-FORMALDEHYDE CONDENSATE WITH A MONOHYDRIC ALCOHOL ESTER OF ROSIN

William D. Jones, West Lafayette, Ind., assignor to Hercules Powder Company, Wilmington, Del., a corporation of Delaware No Drawing. Application July 17, 1946,
Serial No. 684,259

14 Claims. (Cl. 260—25)

This invention relates to improved synthetic resins and to methods for the production thereof. More particularly, this invention relates to improved synthetic resins of very desirable characteristics derived from a cresol-formaldehyde condensation product and a liquid monohydric alcohol ester of rosin and to methods for the production thereof.

It has been known to condense a phenol substituted in the para position with an alkyl radicle such as the tertiary butyl radicle with formaldehyde to prepare drying oil-soluble resins and to further react the resulting condensates with ester gum to prepare drying oil-soluble reaction products, see U. S. 1,800,295 to Honel. It is furthermore known to react drying oil-soluble phenolaldehyde condensates with liquid esters of rosin to provide resinous products characterized by excellent solubility in drying oil and the usual varnish solvents, see U. S. 2,227,548 to Long. Liquid esters of rosin such as the methyl ester have also been employed in conjunction with phenolaldehyde condensates where the rosin ester plays the role of a simple plasticizing ingredient unreacted with the phenolic condensate as described in U. S. 2,380,599 to Kline.

It has now been found that reaction products of very unusual characteristics result from the reaction of cresol-formaldehyde condensates with a liquid monohydric alcohol ester of rosin under certain specific conditions. Broadly, the process of preparing these novel synthetic resins involves reacting cresol with from about 0.7 to about 1.3 moles of formaldehyde per mole of the cresol in aqueous solution in the presence of an alkaline catalyst. This reaction is continued until a condensate results which is drying oil-insoluble but which at the same time has not passed the B stage of polymerization. The reaction mixture is then acidified to cause the formation of a condensate phase and an aqueous phase. The drying oil-insoluble condensate is separated from the aqueous phase with which it is in contact, and the condensate is then reacted with a liquid monohydric alcohol ester of rosin, such as the methyl ester, in the weight ratio of from about 0.5 to about 2.5 parts of rosin ester per part of condensate at a temperature of from about 100° C. to about 300° C. until the rosin ester has substantially reacted with the condensate to form a clear resin.

The B stage of polymerization of the cresolformaldehyde condensate, referred to in the previous paragraph, is well known terminology in the phenolic resin art, see "The Chemistry of Synthetic Resins" by Ellis, page 295. This is the stage in what may be termed the overall condensation reaction at which the condensate is insoluble in acetone, phenol or terpineol but which, if solid, swells upon contact with these reagents. Also the condensate at this B stage can be melted a limited number of times before passing into the infusible stage. The condensation of the cresol and formaldehyde in accordance with this invention is carried out to a point such that the condensate is drying oil-insoluble but at the same time has not passed the B stage of polymerization. From a practical standpoint, this point is determined by stopping the condensation reaction at the point when the formaldehyde in the reaction mixture has been substantially completely consumed. If the reaction is controlled in this manner, drying oil-insoluble condensates which have not passed the B stage of polymerization result.

The novel synthetic resins prepared in accordance with this invention have a number of unique characteristics which make them of great utility in the commercial arts. They are substantially drying oil-insoluble, have excellent resistance to petroleum base greases and at the same time are substantially insoluble in hydrocarbon solvents such as gasoline. They also possess good alkaliresistance. They may be of a thermoplastic or thermosetting nature depending on the particular method of preparation, as more fully pointed out hereinafter.

Having thus indicated in a general way the nature and purpose of this invention, the following examples are offered to illustrate the practice thereof.

*Example 1*

A resin was prepared from cresol, formaldehyde and the methyl ester of rosin in the following manner:

A. Preparation of cresol-formaldehyde condensate 1000 parts of U. S. P. cresol
    675 parts Formalin (37% HCHO)
    39 parts sodium hydroxide The cresol and the Formalin were placed in a three-neck round bottom flask fitted with a thermometer, a reflux condenser and an agitator. With agitation, the sodium hydroxide was added slowly as a 10% aqueous solution. A clear reaction mixture was obtained which increased in temperature due to the heat of reaction. The reaction mixture was held at 50° C., samples thereof being analyzed for unreacted HCHO periodically by polarographic analysis. When the reaction mixture analyzed 0.6% HCHO (about 4 hours from the beginning of the reaction), the reaction mixture was cooled to about 30° C. and sufficient 10% aqueous sulfuric acid was added to make the reaction mixture acid to Congo Red paper. A syrupy lower layer of the cresol-formaldehyde condensate and an aqueous upper layer were formed. The layers were separated and the lower layer of cresol-formaldehyde condensate washed with water.

The washed cresol-formaldehyde condensate was heated to 70° C. and held at 70–88° C. for 1½ hours, at which point the condensate which had originally been opaque, became relatively clear and was drying oil-insoluble.

B. Reaction of cresol-formaldehyde condensate and the methyl ester or rosin
   350 parts the above clear, drying oil-insoluble condensate
   175 parts methyl ester of rosin The condensate was placed in a three-neck flask fitted with a thermometer, a separatory funnel, and an agitator and heated to 100° C. The methyl ester of rosin was placed in the separatory funnel and added slowly with agitation over a period of ¼ hour. The reaction mixture was then heated to 140° C. over a period of 1¾ hours and held at 135 to 140° C. for 55 minutes. At this point, a drop of the reaction mixture in a cold tin panel gave a clear, fusible, hard pill. The reaction mixture was then poured and allowed to cool.

The resulting resin was thermoplastic. It had a drop melting point of 112° C., an acid number of less than 1 using bromphenol blue indicator and could be converted to the liquid state without being transformed into an infusible material. At the same time, the resin was characterized by gasoline insolubility, drying oil-insolubility and was highly resistant to greases such as petroleum base greases.

Example 2

A resin was prepared from cresol, formaldehyde and the methyl ester of rosin as follows:

A. Preparation of cresol-formaldehyde condensate
   1000 parts U. S. P. cresol
   826 parts Formalin (37% HCHO)
   30 parts sodium hydroxide Using the above ingredients, a cresol-formaldehyde condensate was prepared using the procedure as described under Example 1, part A.

B. Reaction of cresol-formaldehyde condensate and the methyl ester of rosin
   199 parts the above clear, drying oil-insoluble condensate
   348 parts methyl ester of rosin The condensate was heated as in Example 1, part B to 105° C. and the methyl ester of rosin added. A period of ½ hour was required for this addition. The reaction mixture was heated to 144° C. and held at 144–156° C. for three hours, and then poured. At this point, a drop of the reaction mixture when chilled gave a clear pill.

This resin was found to be entirely incompatible with drying oils, insoluble in hydrocarbon solvents and unaffected by petroleum base greases. This resin was thermosetting in nature.

Example 3

Another resin was prepared from cresol, formaldehyde and the methyl ester of rosin as follows:

A. Preparation of cresol-formaldehyde condensate
   1000 parts U. S. P. cresol
   900 parts Formalin (37% HCHO)
   30 parts sodium hydroxide Using the above ingredients, a cresol-formaldehyde condensate was prepared using the procedure as described under Example 1, part A.

B. Reaction of cresol-formaldehyde condensate and the methyl ester of rosin
   200 parts the above clear, drying oil-insoluble condensate
   450 parts methyl ester of rosin The condensate was heated as in Example 1, part B to 117° C. and the rosin ester added over a period of 25 minutes. The reaction mixture was then heated to 151° C., held at 151–160° C. for 5½ hours, and then poured.

The resin so produced was thermoplastic in nature, having a drop melting point of 100° C. and an acid number of less than 1 using bromphenol blue indicator. It was substantially insoluble in gasoline and drying oils and was resistant to grease such as petroleum base greases. It was compatible with Hercolyn, the hydrogenated methyl ester of rosin, and in conjunction with Hercolyn and fillers such as asbestos fiber and limestone dust could be compounded into mastic tiles characterized by exceptionally good resistance to alkalies, hydrocarbon solvents and greases.

The cresol ingredient of the cresol-formaldehyde condensate employed in accordance with this invention may be one of the isomeric cresols or mixtures thereof. While Formalin has been employed in the examples, polymers of formaldehyde such as paraformaldehyde and other compounds, which under conditions of the reaction break down to yield free formaldehyde, may be employed equally well. It will be understood that the term "formaldehyde" as used herein and in the claims embraces such obvious equivalents of monomeric formaldehyde.

The condensation of the cresol and the formaldehyde is effected in the presence of an alkaline catalyst. Alkaline catalysts such as sodium hydroxide, potassium hydroxide, calcium hydroxide, ammonium hydroxide, potassium carbonate, etc., may be used. Regardless of which catalyst is used, the catalyst is neutralized to obtain the condensate. Desirably, the condensate is then washed with water in order to remove salts or any other water-soluble material before reacting with a liquid rosin ester. The quantity of catalyst used is dependent on such factors as its own alkalinity, the reactivity of the cresol used, the temperature and time of reaction, etc. It will normally vary from about 0.5% to 25% of the cresol used. However, in the preparation of cresol-formaldehyde condensates using weak alkaline catalysts, it may be necessary to use a quantity of catalyst in excess of 25% by weight of the cresol.

The examples have illustrated the use of the methyl ester of rosin which is reacted with a desired drying oil-insoluble cresol-formaldehyde condensate. Broadly, however, any monohydric alcohol ester of rosin may be employed provided it exists as a liquid at room temperature (25° C.). Thus, for example, the rosin esters of methyl, ethyl, propyl, isopropyl, butyl, etc. alcohols may be employed. The preferred rosin ester, in accordance with the invention, is the methyl ester.

The liquid monohydric alcohol esters employed in accordance with this invention are prepared by methods well known in the art. The rosin ingredient used in such preparation may be either a gum or wood rosin in the crude form or in refined form such as rosins refined by distillation, heat-treatment, extraction with selective solvents to remove color bodies, etc. Likewise, relatively pure rosin acids such as abietic, pimaric, sapinic, etc. acids may be used as equivalents for the usual wood or gum rosin of commerce. It will be understood that the term "rosin" as used herein and in the claims embraces such equivalents.

In preparing a condensate of formaldehyde with a cresol in accordance with this invention, the formaldehyde must be employed in the amount of 0.7 to about 1.3 moles per mole of the cresol to achieve the desired characteristics hereinbefore mentioned. The condensation is carried out in an aqueous medium at any operable temperature. For practical reasons, a reaction temperature of from about 20° C. to about 100° C. is generally employed with a temperature within the range of 40-70° C. being preferred. The time of reaction will vary depending upon the temperature, catalyst concentration, etc. As pointed out previously, it is important that the reaction be stopped under conditions such that the condensate is drying oil-insoluble but at the same time has not passed the B stage of polymerization. If the condensation is carried further, the condensate will have little reactivity with the rosin ester.

When the proper type of condensate has been obtained, the reaction mixture is neutralized to "kill" the catalyst. Neutralization causes a separation of the reaction mixture into two phases, one being an aqueous phase and the other the desired condensate. The condensate is then separated from the aqueous phase and preferably washed with water to remove residual acid or salts. At this point, the condensate may or may not be clear. Generally speaking, it will be opaque in appearance. If so, it is preferably heated at a temperature of from 60° C. to 100° C. until a drop of the condensate is clear when cooled to room temperature.

The condensate, whether opaque or clear, is then reacted with a liquid monohydric alcohol ester of rosin in such amount that the weight ratio of rosin ester to condensate is from about 0.5 to about 2.5. To effect this reaction, a reaction temperature of at least 100° C. but not higher than 300° C. is employed, preferably between about 130° C. and about 220° C. It is preferred to add the rosin ester slowly to the condensate, and it is still further preferred to maintain the temperature of the reaction mixture at from about 100° C. to 130° C. during the period of addition of the rosin ester to present conversion of the condensate to an infusible C stage polymer. Once the rosin ester has been entirely added, the reaction mixture is heated at a temperature of from about 100° C. to about 300° C., and preferably from about 130° C. to about 220° C., until the reaction mixture has reached such condition that a pill cooled to room temperature is found to be clear. It is important that the heating be discontinued at the proper point, otherwise an opaque infusible product usually results.

For any given molal ratio of formaldehyde to cresol, it is possible to make either thermoplastic or thermosetting type resins, depending upon the amount and type of liquid monohydric alcohol ester of rosin employed. There is a certain limiting weight ratio of rosin ester to condensate above which thermoplastic resins are produced and below which thermosetting resins are produced. This limiting weight ratio is furthermore dependent upon the reaction conditions employed in making the condensate. For example, if U. S. P. cresol is reacted with formaldehyde for 3 hours at 60° C. in the presence of NaOH (3% by weight based on the cresol), the following limiting weight ratios of methyl ester of rosin to condensate have been found to apply in so far as the production of thermosetting and thermoplastic resins is concerned:

| Molal Ratio of Formaldehyde to Cresol | Weight Ratio of Methyl Ester of Rosin to Condensate for Thermosetting Resins | Weight Ratio of Methyl Ester of Rosin to Condensate for Thermoplastic Resins |
| --- | --- | --- |
| 1.0 | Below 1.2 | Above 1.2 |
| 1.1 | Below 1.9 | Above 1.9 |
| 1.2 | Below 2.2 | Above 2.2 |

The synthetic resins produced in accordance with this invention have very interesting and useful properties. They are substantially drying oil-insoluble; are highly resistant to petroleum base greases such as lubricating grease. At the same time, they are substantially resistant to hydrocarbon solvents generally and in particular to paraffinic type hydrocarbons such as gasoline and the like. The fact that they can be either thermoplastic or thermosetting depending on the conditions of their manufacture contributes to their versatility in commercial application.

When compounded with fillers and compatible plasticizers, these resins provide compositions characterized by unusual toughness. Their light color is an added advantage in that compositions containing the same can be tinted to light pastel shades. The resins per se are also relatively free of objectionable odors oftimes encountered with cresol containing synthetic resins.

The resins prepared in accordance with this invention are unique in that they have as one of their ingredients a large percentage of a liquid monohydric alcohol ester of rosin such as the methyl ester which in itself is infinitely miscible with the aliphatic hydrocarbon solvents such as gasoline. However, when the rosin esters are reacted with the cresol-aldehyde condensates, the resultant products are essentially gasoline-insoluble.

The resins of this invention are very useful as a component of the binder in mastic floor tile manufacture due to the fact that the use of such resins enables the production of tiles characterized by pale color, good alkali resistance, excellent resistance to greases and aliphatic hydrocarbon solvents and excellent wearing properties. In this particular use, the thermoplastic type resins are preferably employed. A typical tile formulation using such a resin, for example, the resin of Example 3 is the following:

| | Parts |
| --- | --- |
| Asbestos fiber | 435 |
| Limestone dust | 220 |
| Example 3 resin | 250 |
| Hydrogenated methyl ester of rosin | 20 |

The above ingredients are compounded on a two-roll mill into a tile which is characterized by excellent resistance to alkalies, pale color, resistance to petroleum hydrocarbons and good impact resistance. Other plasticizers may be substituted in the above formulation for the hydrogenated methyl ester of rosin, such as dibutyl phthalate, chlorinated cottonseed oil and ethyl phthalyl ethyl glycolates; and the proportions of the ingredients may be varied widely. It is possible to further vary the tile properties, with particular reference to increasing its flexural and impact strength, by the incorporation of compatible polymers such as natural and synthetic rubber, vinyl copolymers, polyvinyl butyral, ethyl cellulose, etc.

The thermoplastic resins also find utility in the manufacture of phonograph discs. Thus, the the resin of Example 3 may be used in the following formulation:

| | Parts |
|---|---|
| Shellac | 300 |
| Example 3 resin | 100 |
| Copal gum | 40 |
| Vinsol resin | 40 |
| Zinc stearate | 6 |
| Carbon black | 20 |
| Ground whiting | 1125 |
| Slate flour | 375 |

(Vinsol resin is extracted pinewood pitch characterized by substantial insolubility in petroleum hydrocarbons and comprising a residue low in abietic acid remaining after separation of refined rosin high in abietic acid from the resinous material obtained by extraction of pinewood with a solvent.)

The above ingredients are reduced to a powder and thoroughly mixed before being processed on a two-roll mill to produce a uniformly blended composition. The composition is sheeted from the two-roll mill, allowed to cool and broken up. Records are prepared from the composition in the usual manner.

The thermoplastic resins of the invention are compatible with synthetic rubbers such as Buna N (copolymer of butadiene and acrylonitrile), neoprene latex, etc., cellulose derivatives such as ethyl cellulose, etc., vinyl polymers such as polyvinyl butyral, vinyl copolymers, etc., and with various resins such as the cumars, rosin esters, etc. In view of these compatibility characteristics, the resins may be used in thermoplastic protective coatings, adhesive compositions, etc., in conjunction with the above-mentioned film-formers. The resins may also be used with synthetic rubbers in various rubber compounding operations.

Emulsions of the thermoplastic resins may be compounded with synthetic rubbers such as neoprene latex, etc., and the resulting compositions used in adhesive applications and in the back-sizing of rugs. The thermoplastic resins may also be used without any additional film-forming materials for back-sizing rugs to provide stiffness and shampoo resistance.

The thermosetting resins are particularly useful as binders for glass wool. Thus, for example, the resin of Example 2 may be employed in the following formulation:

| | Parts |
|---|---|
| Example 2 resin | 400 |
| Carbon tetrachloride | 100 |
| 10% ammonium caseinate solution | 400 |
| Water | 200 |

An emulsion is made by dissolving the resin in the carbon tetrachloride and emulsifying the resulting solution in a colloid mill with the aqueous ammonium caseinate solution. The finished emulsion is adjusted to 40% solids by the addition of water and then used to impregnate glass wool by spraying it on the fibers, pressing the treated fibers into bats and heat-treating the bats at 200° C. until the resin has thermoset.

The thermosetting resins may also be used in the lamination of cellulose bases such as wood, paper, etc. For example, kraft paper may be impregnated with emulsions of the resins, the paper dried to remove the bulk of the water, and the desired number of plies of paper laminated together under heat and pressure. These resins may also be used as the film-forming components of protective coatings useful as baking-type finishes.

All parts and proportions in this specification and claims are by weight unless otherwise indicated.

What I claim and desire to protect by Letters Patent is:

1. A synthetic resin comprising the reaction product of a drying oil-insoluble, alkali-condensed methylphenol-formaldehyde condensate which has not passed the B stage of polymerization and a liquid monohydric alcohol ester of rosin in the weight ratio of from about 0.5 to about 2.5 parts of rosin ester per part of condensate, said methylphenol-formaldehyde condensate being the reaction product of methylphenol with from about 0.7 to about 1.3 moles of formaldehyde per mole of methylphenol, the monohydric alcohol residue of said rosin ester being free of substituents which are reactive with the methylphenol-formaldehyde condensate, said synthetic resin being characterized by substantial drying oil-insolubility, hydrocarbon insolubility and grease resistance.

2. A synthetic resin comprising the reaction product of a drying oil-insoluble, alkali-condensed methylphenol-formaldehyde condensate which has not passed the B stage of polymerization and a liquid monohydric alcohol ester of rosin in the weight ratio of from about 0.5 to about 2.5 parts of rosin ester per part of condensate, said methylphenol-formaldehyde condensate being the reaction product of a mixture of isomeric methylphenols with from about 0.7 to about 1.3 moles of formaldehyde per mole of methylphenol, the monohydric alcohol residue of said rosin ester being free of substituents which are reactive with the methylphenol-formaldehyde condensate, said synthetic resin being characterized by substantial drying oil-insolubility, hydrocarbon insolubility and grease resistance.

3. A thermoplastic synthetic resin comprising the reaction product of a drying oil-insoluble, alkali - condensed methylphenol - formaldehyde condensate which has not passed the B stage of polymerization and a liquid monohydric alcohol ester of rosin in the weight ratio of from about 0.5 to about 2.5 parts of rosin ester per part of condensate, said methylphenol-formaldehyde condensate being the reaction product of methylphenol with from about 0.7 to about 1.3 moles of formaldehyde per mole of methylphenol, the monohydric alcohol residue of said rosin ester being free of substituents which are reactive with the methylphenol-formaldehyde condensate, said synthetic resin being characterized by substantial drying oil-insolubility, hydrocarbon insolubility and grease resistance.

4. A thermosetting synthetic resin comprising the reaction product of a drying oil-insoluble, alkali - condensed methylphenol - formaldehyde condensate which has not passed the B stage of polymerization and a liquid monohydric alcohol ester of rosin in the weight ratio of from about 0.5 to about 2.5 parts of rosin ester per part of condensate, said methylphenol-formaldehyde condensate being the reaction product of methylphenol with from about 0.7 to about 1.3 moles of formaldehyde per mole of methylphenol, the monohydric alcohol residue of said rosin ester being free of substituents which are reactive with the methylphenol-formaldehyde condensate, said synthetic resin being characterized by substantial drying oil-insolubility, hydrocarbon insolubility and grease resistance.

5. A synthetic resin comprising the reaction product of a drying oil-insoluble, alkali-condensed methylphenol-formaldehyde condensate which has not passed the B stage of polymerization and the methyl ester of rosin in the weight ratio of from about 0.5 to about 2.5 parts of rosin ester per part of condensate, said methylphenol-formaldehyde condensate being the reaction product of methylphenol with from about 0.7 to about 1.3 moles of formaldehyde per mole of methylphenol, said synthetic resin being characterized by substantial drying oil-insolubility, hydrocarbon insolubility and grease resistance.

6. A synthetic resin comprising the reaction product of a drying oil-insoluble, alkali-condensed methylphenol-formaldehyde condensate which has not passed the B stage of polymerization and the methyl ester of rosin in the weight ratio of from about 0.5 to about 2.5 parts of rosin ester per part of condensate, said methylphenol-formaldehyde condensate being the reaction product of a mixture of isomeric methylphenols with from about 0.7 to about 1.3 moles of formaldehyde per mole of methylphenol, said synthetic resin being characterized by substantial drying oil-insolubility, hydrocarbon insolubility and grease resistance.

7. The method of producing a resin which is substantially drying oil-insoluble, hydrocarbon insoluble and grease resistant which comprises reacting methylphenol with from about 0.7 to about 1.3 moles of formaldehyde per mole of methylphenol in aqueous solution in the presence of an alkaline catalyst to produce a drying oil-insoluble condensate but which at the same time has not passed the B stage of polymerization, acidifying the reaction mixture, separating the condensate from the aqueous solution, and reacting the condensate with a liquid monohydric alcohol ester of rosin in the weight ratio of from about 0.5 to about 2.5 parts of rosin ester per part of condensate at a temperature of from about 100° C. to about 300° C. until the rosin ester has reacted substantially with the condensate to form a clear resin, the monohydric alcohol residue of said rosin ester being free of substituents which are reactive with the methylphenol-formaldehyde condensate under the conditions employed.

8. The method of producing a resin which is substantially drying oil-insoluble, hydrocarbon insoluble and grease resistant which comprises reacting a mixture of isomeric methylphenols with from about 0.7 to about 1.3 moles of formaldehyde per mole of methylphenol in aqueous solution in the presence of an alkaline catalyst to produce a drying oil-insoluble condensate but which at the same time has not passed the B stage of polymerization, acidifying the reaction mixture, separating the condensate from the aqueous solution, and reacting the condensate with a liquid monohydric alcohol ester of rosin in the weight ratio of from about 0.5 to about 2.5 parts of rosin ester per part of condensate at a temperature of from about 100° C. to about 300° C. until the rosin ester has reacted substantially with the condensate to form a clear resin, the monohydric alcohol residue of said rosin ester being free of substituents which are reactive with the methylphenol-formaldehyde condensate under the conditions employed.

9. The method of producing a resin which is substantially drying oil-insoluble, hydrocarbon insoluble and grease resistant which comprises reacting methylphenol with from about 0.7 to about 1.3 moles of formaldehyde per mole of methylphenol in aqueous solution in the presence of an alkaline catalyst to produce a drying oil-insoluble condensate but which at the same time has not passed the B stage of polymerization, acidifying the reaction mixture, separating the condensate from the aqueous solution, and reacting the condensate with the methyl ester of rosin in the weight ratio of from about 0.5 to about 2.5 parts of rosin ester per part of condensate at a temperature of from about 100° C. to about 300° C. until the rosin ester has reacted substantially with the condensate to form a clear resin.

10. The method of producing a resin which is substantially drying oil-insoluble, hydrocarbon insoluble and grease resistant which comprises reacting a mixture of isomeric methylphenols with from about 0.7 to about 1.3 moles of formaldehyde per mole of methylphenol in aqueous solution in the presence of an alkaline catalyst to produce a drying oil-insoluble condensate but which at the same time has not passed the B stage of polymerization, acidifying the reaction mixture, separating the condensate from the aqueous solution, and reacting the condensate with the methyl ester of rosin in the weight ratio of from about 0.5 to about 2.5 parts of rosin ester per part of condensate at a temperature of from about 100° C. to about 300° C. until the rosin ester has reacted substantially with the condensate to form a clear resin.

11. The method of producing a resin which is substantially drying oil-insoluble, hydrocarbon insoluble and grease resistant which comprises reacting methylphenol with from about 0.7 to about 1.3 moles of formaldehyde per mole of methylphenol in aqueous solution in the presence of an alkaline catalyst to produce a drying oil-insoluble condensate but which at the same time has not passed the B stage of polymerization, acidifying the reaction mixture, separating the condensate from the aqueous solution, dehydrating the condensate by heating at a temperature of from 60° C. to 100° C. until a drop of the condensate is clear when cooled to 25° C., and reacting the condensate with a liquid monohydric alcohol ester of rosin in the weight ratio of from about 0.5 to about 2.5 parts of rosin ester per part of condensate at a temperature of from about 100° C. to about 300° C. until the rosin ester has reacted substantially with the condensate to form a clear resin, the monohydric alcohol residue of said rosin ester being free of substituents which are reactive with the methylphenol-formaldehyde condensate under the conditions employed.

12. The method of producing a resin which is substantially drying oil-insoluble, hydrocarbon insoluble and grease resistant which comprises reacting methylphenol with from about 0.7 to about 1.3 moles of formaldehyde per mole of methylphenol in aqueous solution in the presence of an alkaline catalyst to produce a drying oil-insoluble condensate but which at the same time has not passed the B stage of polymerization, acidifying the reaction mixture, separating the condensate from the aqueous solution, dehydrating the condensate by heating at a temperature of from 60° C. to 100° C. until a drop of the condensate is clear when cooled to 25° C., reacting the condensate with a liquid monohydric alcohol ester of rosin in the weight ratio of from about 0.5 to about 2.5 parts of rosin ester per part of condensate by adding the rosin ester slowly to the condensate maintained at a temperature of from about 100° C. to about 300° C., and then continuing to heat the reaction mixture at a temperature of from about 100° C. to about 300° C. until the rosin ester has reacted substantially with the condensate to form a clear resin, the monohydric alcohol residue of said rosin ester being free of substituents which are reactive with the methylphenol-formaldehyde condensate under the conditions employed.

13. The method of producing a resin which is substantially drying oil-insoluble, hydrocarbon insoluble and grease resistant which comprises reacting methylphenol with from about 0.7 to about 1.3 moles of formaldehyde per mole of methylphenol in aqueous solution in the presence of an alkaline catalyst to produce a drying oil-insoluble condensate but which at the same time has not passed the B stage of polymerization, acidifying the reaction mixture, separating the condensate from the aqueous solution, dehydrating the condensate by heating at a temperature of from 60° C. to 100° C. until a drop of the condensate is clear when cooled to 25° C., reacting the condensate with a liquid monohydric alcohol ester of rosin in the weight ratio of from about 0.5 to about 2.5 parts of rosin ester per part of condensate by adding the rosin ester slowly to the condensate maintained at a temperature of from about 100° C. to about 130° C., and then continuing to heat the reaction mixture at a temperature of from about 130° C. to about 220° C. until the rosin ester has reacted substantially with the condensate to form a clear resin, the monohydric alcohol residue of said rosin ester being free of substituents which are reactive with the methylphenol-formaldehyde condensate under the conditions employed.

14. The method of producing a resin which is substantially drying oil-insoluble, hydrocarbon insoluble and grease resistant which comprises reacting methylphenol with from about 0.7 to about 1.3 moles of formaldehyde per mole of methylphenol in aqueous solution in the presence of an alkaline catalyst to produce a drying oil-insoluble condensate but which at the same time has not passed the B stage of polymerization, acidifying the reaction mixture, separating the condensate from the aqueous solution, and reacting the condensate with a liquid monohydric alcohol ester of rosin in the weight ratio of from about 0.5 to about 2.5 parts of rosin ester per part of condensate at a temperature of from about 130° C. to about 220° C. until the rosin ester has reacted substantially with the condensate to form a clear resin, the monohydric alcohol residue of said rosin ester being free of substituents which are reactive with the methylphenol-formaldehyde condensate under the conditions employed.

WILLIAM D. JONES.

REFERENCES CITED

The following references are of record in the file of this patent:

UNITED STATES PATENTS

| Number | Name | Date |
|---|---|---|
| 2,227,548 | Long | Jan. 7, 1941 |
| 2,380,599 | Kline | July 31, 1945 |

OTHER REFERENCES

P. O. Powers, Ind. & Eng. Chem., vol. 36, No. 11 (Nov. 1944), pp. 1008–1012.